United States Patent [19]

Bivens et al.

[11] 4,280,943

[45] Jul. 28, 1981

[54] ORGANIC GROUTING COMPOSITION FOR ANCHORING A BOLT IN A HOLE

[75] Inventors: Joseph R. Bivens, Martinsburg, W. Va.; William M. Lyerly, Hagerstown, Md.; Walter J. Simmons, Martinsburg, W. Va.

[73] Assignee: E. I. Du Pont de Nemours & Co., Wilmington, Del.

[21] Appl. No.: 92,712

[22] Filed: Nov. 8, 1979

[51] Int. Cl.$^3$ .............................................. C08L 67/06
[52] U.S. Cl. ...................... 260/29.2 E; 260/29.2 UA; 260/29.6 S
[58] Field of Search .................. 260/29.2 E, 29.2 UA, 260/29.6 CM, 29.6 PS, 29.6 S, 40 R

[56] References Cited

U.S. PATENT DOCUMENTS

| | | | |
|---|---|---|---|
| 3,302,410 | 2/1967 | McLean | 61/36 |
| 3,324,662 | 6/1967 | McLean | 61/35 |
| 3,324,663 | 6/1967 | McLean | 61/36 |
| 3,666,697 | 5/1972 | Peloza | 260/22 CB |
| 3,731,791 | 5/1973 | Fourcade et al. | 206/47 A |

OTHER PUBLICATIONS

*Ashlands Offers Water Extended Polyester* 1/8/1968 (pp. 34–35), Chem. & Engineering News
*Water Filled Polyester Foams Combine High Density, Low Cost* 7/1979, Materials Engineering by Fabian, R. J.

*Primary Examiner*—Theodore E. Pertilla
*Attorney, Agent, or Firm*—Diamond C. Ascani

[57] ABSTRACT

An improved rock-bolt grouting composition based on a cross-linkable unsaturated polymerizable polyester resin formulation in one component and a peroxide catalyst in a separate component, contains diffused water, preferably in the catalyst component, in an amount sufficient to provide a weight ratio of resin formulation to water no greater than about 6.0, and a particulate solid filler in both components in an amount sufficient to provide a weight ratio of filler to resin formulation of at least about 3.0. The filled, water-extended composition generally expands during the cross-linking of the polymer, and greater interfacial strength in smooth-walled boreholes has been found. Compositions in which water is the catalyst vehicle are preferred because their shelf life is better than those containing an oil-based catalyst.

15 Claims, No Drawings

ORGANIC GROUTING COMPOSITION FOR ANCHORING A BOLT IN A HOLE

BACKGROUND OF THE INVENTION

1. Field of the Invention

The present invention relates to organic grouting compositions for anchoring a reinforcing member in a hole, e.g., in a mine roof, and more particularly to those compositions comprised of a resin component containing an unsaturated polymerizable polyester resin and a monomeric polymerizable ethylenic cross-linking agent therefor, and a peroxide catalyst component, which is maintained separate from the resin component until the time of use and, when mixed therewith around a reinforcing member in a hole, catalyzes the rapid reaction of the polyester and ethylenic monomer to form a hardened grout.

2. Description of the Prior Art

Anchor bolts are employed in various fields of engineering, for example, as strengthening or reinforcing members in rock formations and in structural bodies. The bolts are inserted into drill holes in the formation or body, and often are fixed or anchored therein, at their inner end or over substantially their entire length, by means of a reactive grouting composition which hardens around the bolt. When used in a mine roof, bolts grouted in this manner help significantly to prevent mine roof failure. Because unsupported rock strata have a tendency to move vertically and laterally, and this motion is what commonly causes the roof to fail, it is important that bolts be installed as soon as possible in a newly exposed roof and that the required strength provided by the hardening of the grouting composition be developed rapidly, e.g., in a matter of a few minutes, or within an hour or so, depending on the type of mine. Rapid hardening also contributes to the efficiency of the bolt installation operation.

Reactive grouting compositions which have been used in rock bolt anchoring include inorganic cement mortars and hardenable synthetic resins, and these have been introduced into the drill holes through a feed pipe, or in cartridged form. Although the reactive ingredients of the composition can be delivered into the hole in combined and mixed form either before or after bolt insertion, usually they have been delivered separately into the hole, e.g., in compartmentized cartridges, and combined therein and mixed, e.g., by inserting the bolt into the cartridges and rotating it.

A hardenable synthetic resin composition that has gained wide acceptance as a bolt-anchoring grouting composition is a composition containing an unsaturated polymerizable polyester resin and a monomeric polymerizable ethylenic cross-linking agent therefor. These materials, together with a polymerization inhibitor or stabilizer, and a promoter for a peroxide catalyst, constitute a resin formulation contained in a first grouting component (A). A cross-linking peroxide catalyst system is contained in a second grouting component (B), kept separated from component A until the hardening reaction is to take place. When components A and B are combined and mixed, the action of the catalyst causes the cross-linking reaction between the polyester and ethylenic monomer to take place, resulting in a thermoset, hard resin.

U.S. Pat. Nos. 3,324,662, 3,324,663, and 3,302,410, all granted to D. C. McLean, describe a two-component resin composition of this type which additionally contains 5 to 10 percent (based on final resin volume) of a water-receiver filler in one of the components, and water in the other component in at least an amount sufficient to react with at least a substantial portion of the water-reactive filler and also minimize shrinkage. The composition also contains a thickener such as pyrogenic silica, and only optionally an inert filler for the sole stated purpose of reducing the unit volume cost of the resin. In McLean's preferred composition, water is emulsified in the resin using an emulsifying agent, and the peroxide catalyst is mixed with cement.

The use of water in the above-mentioned compositions is associated with the presence of a water-reactive filler therein. Indeed, the amount of water indicated to be usually preferred is about that which will react with the water-reactive filler, and even only half of this amount is said to give good results. When used in this manner, i.e., combined with a water-reactive filler such as cement, water is disclosed to reduce shrinkage of the resin.

U.S. Pat. No. 3,731,791, issued to Fourcade et al., describes the use of a peroxide-catalyzed cross-linkable unsaturated polyester resin system in a single-compartment cartridge wherein the resin component and the catalyst component are separated solely by a layer of reaction product formed when the two components are brought into direct contact with each other. Although water is present in one of the resin components and one of the catalyst components described, the patentees nevertheless disclose the use of inorganic fillers such as calcite principally to reduce the shrinkage of their resinous mass which is said to always occur during polymerization.

The gel time of a given resin formulation is the time that elapses between the mixing of the reactive components and the hardening or stiffening of the resin. It will be shorter at higher temperatures and/or with higher promoter content, and vice versa. The cure time, on the other hand, is the time required for the composition to achieve full strength, or a high percentage of its final strength. A desirable goal is that the composition attain about 80% of its final strength in an hour or less. It is especially important that as strong as possible an interfacial bond between the resin and the wall of the hole, and the resin and the reinforcing member, be achieved during the curing period inasmuch as the advantageous keying effect achieved by a shifting of rock strata relative to one another usually is not available during this period because the roof has only recently been exposed.

SUMMARY OF THE INVENTION

The present invention provides an improvement in an organic grouting composition comprising (a) a first component containing a resin formulation comprising an unsaturated polymerizable polyester resin mixed with a monomeric polymerizable ethylenic cross-linking agent therefor, a polymerization inhibitor, and a promoter for a peroxide catalyst, (b) separated from the first component, a second component containing a peroxide catalyst, and (c) a particulate solid filler or aggregate in both the first and second components, the polyester and cross-linking agent, when the first and second components are in a combined and mixed condition around a reinforcing member in a hole, being adapted to react rapidly to form a hardened anchoring composition around the reinforcing member. The improvement of the invention comprises the addition to the first and/or second components, preferably to the second, of (1) water in an amount sufficient to provide a weight ratio of resin formulation to water in the range of about from 0.3 to 6, preferably about from 1 to 5, and (2) a water-diffusing or dispersing agent, the resin formulation constituting about from 5 to 22 percent, water about from 4 to 19 percent, and solid filler about from 65 to 75 percent of the composition by weight, the weight ratio of solid filler to resin formulation being in the range of about from 3 to 15, and any portion of the solid filler which is hydratable being present only in a substantially water-free component.

In a most preferred composition of the invention, substantially all of the water is present in the second, i.e., the catalyst, component. In another composition of the invention which is sometimes preferred especially with certain packaged systems, substantially all of the solid filler in the composition is non-hydratable, i.e., not water-reactive.

DETAILED DESCRIPTION OF THE INVENTION

The resin grouting composition of this invention contains water and one or more particulate solid fillers in a compositional balance with the resin formulation that results in preferred compositions having a significantly improved interfacial strength as revealed by measurements of the force required to push grout specimens in smooth-wall simulated boreholes, when contrasted to the strengths attained with conventional polyester cross-linking compositions used in rock bolt grouts, i.e., compositions in which no water is added, as well as the water-containing compositions described above. Surprisingly, the presence of added water in the composition in a sufficiently large amount to provide a weight ratio of resin formulation to water no greater than about 6, and preferably in the range of about from 1 to 5, strengthens rather than weakens the composition with respect to interfacial strength in smooth boreholes, provided that a sufficiently large amount of a solid filler is present to provide a weight ratio of solid filler to resin formulation in the range of about from 3 to 15, and preferably about from 3.5 to 5.5, even in a preferred case in which substantially all of the solid filler is non-hydratable, i.e., non-reactive with the water in the composition.

Although it is not intended that the invention be limited by the bounds of theoretical considerations, it is believed that the improvement observed with compositions of the invention may be explained by the fact that the freshly mixed composition undergoes a positive volume change or expansion, which is more pronounced and consistent at lower ratios of resin formulation to water and higher ratios of solid filler to resin. At the maximum resin/water ratio of 6 and minimum filler/resin ratio of 3, expansion of the composition may be observed only with a slower-gelling resin, e.g., one that sets in two or more minutes. However, within the preferred range of resin/water ratios, i.e., about from 1 to 5, and filler/resin ratios, i.e., about from 3.5 to 5.5, all freshly mixed compositions appear to undergo expansion regardless of the gelling time of the resin. It is believed that improved interfacial strength is a result of the positive volume change that occurs when the resin and catalyst components are mixed (or the minimal negative change that may occur with a fast-setting resin, i.e., one having a one-minute gel time, in a maximum resin/water ratio composition).

In the present composition, a first component (A), the resin component, contains a resin formulation comprised of an unsaturated polymerizable polyester resin mixed with a monomeric polymerizable ethylenic cross-linking agent therefor, a promoter for a peroxide catalyst, and a polymerization inhibitor or stabilizer to give the composition the required shelf life. Such a resin formulation is described in the aforementioned U.S. Pat. No. 3,324,663, the disclosure of which is incorporated herein by reference. The polymerizable polyester resin can be the essentially linear product of the reaction of an $\alpha,\beta$-ethylenically unsaturated polycarboxylic acid, e.g., maleic or fumaric acid, and an aliphatic polyol, e.g., propylene glycol. A nonpolymerizable dibasic acid or anhydride such as phthalic anhydride also may be admixed therewith. The monomeric polymerizable ethylenic cross-linking agent usually is styrene, but may be vinyltoluene or another compound containing the $CH_2=C<$ group. The catalyst promoter present in component A usually is an aniline promoter, e.g., dimethyl-, diethyl-, or di-n-propylaniline; and the stabilizer a phenolic compound, e.g., hydroquinone.

The catalyst in the second component (B) is of the conventional peroxide type also described in U.S. Pat. No. 3,324,633, benzoyl peroxide being the one most commonly employed. The latter is conveniently used in the form of a commercially available paste containing a phthalic acid ester and a small amount of water, the latter typically constituting about 15 percent of the paste by weight. Based on the total weight of grouting composition, i.e., the combined weights of components A and B, including that of the particulate solid filler therein, the water content derived solely from such catalyst pastes, i.e., exclusive of added water, normally will be only a few tenths of one percent, an amount which would be of little consequence in terms of affecting the strength of the grout in one way or another.

A particulate solid filler is present in component A and in component B. The filler, effective in conjunction with the water added to one or both of the components, both filler and water being in proper compositional balance with respect to the resin formulation, is critical to the attainment of the previously described improvement in interfacial strength. The location of the filler in both of the components, rather than in only one or the other, is primarily predicated on achieving a desirable volume relationship between components A and B within the constraints imposed by the borehole or package volume and the required resin/catalyst, resin/water, and filler/resin weight relationships, and also on providing the rheological properties considered desirable from the point of view of pumpability, installation, etc.

If one of the components A and B is substantially water-free, all or part of the solid filler therein can be an hydratable, i.e., water-reactive, material, e.g., an hydraulic cement such as Portland cement or a gypsum plaster; while all of the filler in the other component (the water-containing component) must, of course, be non-hydratable to prevent hardening of the composition before installation in a borehole. However, the improved strength achieved with the present grout does not depend on a chemical bonding of the water therein, and in any event the presence of hydratable filler in the catalyst component of the composition is less preferred for the following reason. In the catalyst component of conventional bolt-anchoring resin compositions, oil is often used as a vehicle for the solids therein. Although oil-based catalyst components are useful, compositions containing them may have a less than optimum shelf life in terms of a loss in uniformity of their gel time after storage, resulting, it is believed, from an interaction between the oil and the peroxide catalyst which is more or less pronounced depending on the storage time and temperature. In this respect, compositions containing water-based catalyst components (which can contain fillers only of the non-hydratable type) have better shelf life than those in which oil-based catalyst components (which can contain hydratable fillers) are present and therefore the former are preferred.

While an hydratable filler may be present in the resin component, usually in combination with some nonhydratable filler, in some cases it may be preferred to have substantially no hydratable filler present in the composition, inasmuch as this eliminates the need for restrictive measures to prevent premature hardening of the resin component due to a reaction of hydratable filler therein. For example, in a compartmented film cartridge, water in the catalyst component could permeate into the resin component during storage and cause hardening if an hydratable filler were present therein unless a suitable barrier film such as polyethylene were used. Also, care would have to be taken to avoid water-reactive fillers that are reactive with respect to the resin formulation.

Any particulate material that is substantially inert toward water and toward the materials in the component in which it is to be incorporated can be used as the non-hydratable filler or aggregate. Limestone and sand are preferred fillers, limestone being especially preferred on the basis of pumping and cost considerations. Other materials can be used, however, including particles of competent rocks or rock-forming minerals such as calcite, granite, basalt, dolomite, andesite, feldspars, amphiboles, pyroxenes, olivine, iron oxides, gabbro, rhyolite, syenite, diorite, dolerite, peridotite, trachyte, obsidian, quartz, etc., as well as materials such as vitrified clay, slag, cinders, fly ash, glass cullet, and fibrous materials such as chopped metal (preferably steel) wire, glass fibers, asbestos, cotton, and polyester and aramid fibers. Different particle sizes and shapes (and mixtures thereof) can be used. Mixtures of different fillers also can be used. While the same filler(s) need not be used in components A and B, a preferred composition contains limestone in both components A and B.

Water is present in one or both of components A and B, preferably in component B, and most preferably in component B only. Regardless of whether or not water may be introduced into the composition as part of a commercial catalyst formulation, as described above, water is added to the composition in an amount such that water constitutes at least about 4 percent of the total composition by weight and the weight ratio of resin formulation to water is no greater than about 6. This condition contributes to the expandability of the composition. On the other hand, no more than about 19 percent of the weight of the composition should be water, nor should a resin/water weight ratio of less than about 0.3 be employed, to assure the formation of the necessary amount of cured polymer network needed for strength.

A sufficiency of cured polymer network also depends on a weight of resin formulation in the composition of at least about 5 percent, and a weight of solid filler of no more than about 75 percent, of the total weight of the composition, with a filler/resin weight ratio no greater than about 15. On the other hand, to afford a composition that can expand on curing within the specified range of resin/water ratios, the weight of solid filler should be at least about 65 percent, and that of the resin formulation no more than about 22 percent, of the total weight of the composition, with a filler/resin weight ratio of at least about 3. In preferred compositions the resin/water ratio is about from 1 to 5, and the filler/resin ratio about from 3.5 to 5.5.

In the present composition the water may be an aqueous solution, e.g., of a salt, or a mixture of water and a water-miscible liquid such as ethylene glycol, which may be added, for example, to depress the freezing point. Whenever a water content or resin/water ratio is given herein, the value given is based on the total aqueous liquid present, e.g., water alone, or aqueous solution or mixture.

Any component containing water also contains a diffusing or dispersing agent, preferably a thickener, which helps to keep the water in diffused or well-mingled form when the components are in a separated condition, and allows a more uniform distribution of ingredients when the components are mixed. One or more surfaceactive agents can be added to keep the water diffused through the component(s), e.g., dispersed in an organic liquid which may be present, such as the phthalic acid ester present in the benzoyl peroxide paste described above. The consistency of a smooth paste containing suspended filler particles results. Surfactants of the non-ionic, anionic, and cationic type can be used, preferred surfactants being non-ionic and including sorbitan monooleate and monolaurate, polyoxyethylene monooleate and hexaoleate, polyoxyethylene sorbitan trioleate and monolaurate, and polyoxyethylene tridecyl ether.

Preferably the water contains a thickener as all or part of the diffusing agent. The thickener prevents the water from separating out rapidly when the components are mixed, and also holds the filler particles in suspension. The thickener is a solid material that absorbs water, is hydratable, or is somewhat water-soluble, and can be an inorganic material such as a clay or fumed silica, or an organic material. Organic thickeners that can be used include methylcelluloses, carboxymethylcelluloses, polyvinyl alcohols, starches, carboxy vinyl polymers, and other mucilages and resins such as galactomannans (e.g., guar gum), polyacrylamides, and polyethylene oxides.

The amount of thickener in the water depends on the specific material used, and specifically on the degree of thickening attainable therewith, a function generally of the molecular weight and degree of substitution of the material, and depends also on the amount of filler present. Generally, the amount of thickener will be in the range of about from 0.01 to 2.0, preferably about from 0.05 to 1.0, percent of the total weight of the composition.

The invention will now be illustrated by way of the following examples. Percentages are by weight.

EXAMPLE 1

A composition having a resin component (A) and a catalyst component (B) in a 70/30 percentage ratio was prepared. The resin component was a mixture of 27% of a resin formulation and 73% limestone. The base resin formulation consisted approximately of 66.7% of a polyester resin, 17.1% styrene, 11.4% vinyl toluene, 1.9% fumed silica, and 2.9% stabilizers and promoters. The polyester resin was the esterification product of maleic anhydride and propylene glycol, the maleic anhydride having been partially replaced with phthalic anhydride (29.4% maleic anhydride, 29.6% phthalic anhydride, and 41% propylene glycol). The formulation was described by the supplier as "One Minute Resin", denoting the presence of sufficient promoter to produce a gel time of one minute when the resin formulation is mixed with a benzoyl peroxide catalyst.

The catalyst component has a mixture of 72.5% limestone, 19.1% water, 0.4% of methylcellulose, and 8.0% of a benzoyl peroxide (BPO) catalyst paste sold by Witco Chemical Company, Inc. and consisting, approximately, of 49.3% BPO, 24.7% butyl phenyl phthalate, 14.8% water, 7.9% polyalkylene glycol ether, 2.0% zinc stearate, and 1.3% fumed silica.

Based on the total weight of components A and B in the 70/30 composition, the weight ratio of the resin formulation to water was 3.3, exclusive of water present in the BPO paste (3.1 including the latter); filler to resin 3.9; and resin to BPO paste 7.9. The resin constituted 18.9%, limestone 72.9%, water 5.7%, BPO paste 2.4%, and methylcellulose 0.1% of the composition.

The interfacial strength developed when the components of the composition were combined and mixed in a simulated drill hole was evaluated as follows:

Component A was introduced into one compartment, and component B into the other compartment, of a two-compartment frangible "chub" cartridge such as that described in U.S. Pat. Nos. 3,795,081 and 3,861,522, the cartridge being made of polyethylene terephthalate film. In the sealed compartmented cartridge, which was 43-centimeters-long and 2.3 centimeters in diameter, the two components were maintained separate from one another in their 70/30 A/B weight ratio. The cartridge was inserted into a 61-cm.-long, 2.54-cm.-inner-diameter, smooth-wall steel pipe (simulated borehole). A 74-cm.-long, 1.9-cm.-diameter reinforcing rod (bolt) was inserted into the cartridge at a speed of 7.5 meters per minute at 250 rpm. The pipe, bolt, and cartridge were at about 10° C. During insertion the bolt broke the polyethylene terephthalate film, and mixed the components together. Total mix time was 15 seconds. The resin gelled in about 1 minute, after which the pipe assembly was sawed into 2.54-cm.-long pieces starting 15.2 cm. from the innermost end. After the specimens had returned to room temperature (having become heated in the sawing operation), the force required to push the hardened grouting composition, and the bolt section embedded therein, out of the 2.54-cm. pipe sections was measured at different time intervals.

The following table summarizes the push test results obtained in a number of different grouting tests, each made with a different cartridge and drill hole but with the same grouting composition and under the same conditions as described above. For each grouting test, two specimens were measured at each time interval shown, each number given representing the averaged results of the two measurements. The supplier's lot number for the resin formulation used is given for each test, although every formulation used was designated to be a "One Minute Resin" by the supplier. Differences in suppliers or lot numbers, however, are believed not to have had any notable effect on the push-out tests.

| Test No. | Resin Lot No. | Push-Out Force (Newtons) 1 Hr.[c] | 20 Days[c] | 40 Days[c] |
|---|---|---|---|---|
| 1 | 9E1074[a] | 4493 | — | — |
| 2 | 9E1074 | 2455 | 3772 | 6410[d] |
| 3 | 9E1074 | 2153 | — | — |
| 4 | 9E1074 | 4951 | — | — |
| 5 | 9E1074 | 2113 | 3203 | 2322 |
| 6 | 9E1074 | 3300 | 3274 | — |
| 7 | 9E1074 | 3781 | 3065 | 2713 |
| 8 | 9G1012[a] | 1739 | 747 | — |
| 9 | 9G1012 | 1032 | — | — |
| 10 | 9G1012 | 1966 | — | — |
| 11 | 9G1012 | 1868 | — | — |
| 12 | K39[b] | 2486 | 1810 | 1793 |
| 13[d] | 9E1074 | 6708 | 2575 | 3127 |
| 14[d] | 9E1074 | 7361 | 5351 | — |
|  |  | Average 2695 | Average 2645 | Average 2276 |

[a] Supplier: United States Steel Company
[b] Supplier: Koppers Company, Inc.
[c] Time after mixing of components A and B
[d] Not included in average

CONTROL EXPERIMENT

The same component A was used in a 13/1 weight ratio with the following component B: 44.7% of the same BPO catalyst paste, 27.6% "Cereclor" ® (a chlorinated oil containing 52% chlorine), 27.1% marble dust, and 0.6% fumed silica. The catalyst component contained no added water, i.e., only that which was present in the BPO catalyst paste. This resulted in a water content of only 0.5% based on the total composition, with a resin/water ratio of 50. This control composition was cartridged and push-tested as described above to evaluate its interfacial strength. The following table presents the results for the control composition in the same manner as the previous table does for the composition of the invention.

| Test No. | Resin Lot No. | Push-Out Force (Newtons) 1 Hr.[b] | 20 Days[b] | 40 Days[b] |
|---|---|---|---|---|
| 1 | 9E1074 | 1134 | 712 | 641 |
| 2 | 9E1074 | 745 | 1081 | 979 |
| 3 | K39 | 747 | 805 | 565 |
| 4 | K34[a] | 943 | — | 2180 |
| 5 | K34 | 525 | 458 | 525 |
| 6 | 9E1012[c] | 797 | 734 | 752 |
|  |  | Average 815 | Average 758 | Average 940 |

[a] Supplier: Koppers Company, Inc.
[b] Time after mixing of components A and B
[c] Supplier: United States Steel Company

EXAMPLE 2

Compositions were prepared having the same resin component (Koppers K-39 resin formulation) described in Example 1 and, separated therefrom in the cartridge described therein, the catalyst component described in Example 1 except modified with respect to the amounts of BPO paste, water, limestone, and methylcellulose present. Components A and B were present in different percentage ratios to vary the resin/water and filler/resin ratios in the composition. The following compositions were prepared.

|  | (a) 80/20 A/B | (b) 60/40 A/B | (c) 50/50 A/B | (d) 40/60 A/B | (e) 30/70 A/B | (f) 20/80 A/B |
| --- | --- | --- | --- | --- | --- | --- |
| Component B |  |  |  |  |  |  |
| % BPO Paste | 13.5 | 5.0 | 3.4 | 2.3 | 1.4 | 1.4 |
| % Water* | 18.1 | 20.6 | 22.1 | 20.6 | 23.5 | 24.0 |
| % Limestone | 68.0 | 74.0 | 74.0 | 76.7 | 74.6 | 74.0 |
| % Methocel | 0.4 | 0.4 | 0.5 | 0.4 | 0.5 | 0.5 |
| Total Composition |  |  |  |  |  |  |
| % Resin | 21.6 | 16.2 | 13.5 | 10.8 | 8.1 | 5.4 |
| % Water* | 3.6 | 8.2 | 11.1 | 12.4 | 16.5 | 18.8 |
| % Limestone | 72.0 | 73.4 | 73.5 | 75.2 | 74.1 | 74.6 |
| % BPO Paste | 2.7 | 2.0 | 1.7 | 1.4 | 1.0 | 1.0 |
| Resin/Water* | 6.0 | 2.0 | 1.2 | 0.9 | 0.5 | 0.29 |
| Filler/Resin | 3.3 | 4.5 | 5.4 | 6.7 | 9.2 | 13.8 |
| Resin/BPO Paste | 8.0 | 8.1 | 7.9 | 7.7 | 8.1 | 5.4 |

*Based on water exclusive of that in the BPO paste

Compositions (a), (b), and (c) were evaluated by means of the push tests as described in Example 1. The results were as follows:

|  | Push-Out Force (Newtons) | | |
| --- | --- | --- | --- |
| Composition | 1 Hr.* | 10 Days* | 20 Days* |
| (a) | 3763 | 3656 | 3514 |
| (b) | 4622 | 3696 | 3896 |
| (c) | 4070 | 3042 | 3149 |

*Time after mixing of components A and B

Examples 1 and 2 show that the grouting compositions having added water and filler in the amounts shown are distinctly superior to the control composition in interfacial strength as evidenced by the described push test. For example, the average push-out force required after one hour with the composition of Example 1 was over three times that required with the control grout. After 40 days a push-out force nearly 2.5 times greater was needed with the Example 1 composition as compared to the control. The slight reduction in advantage after 40 days may be the result of an impermanence of the initial positive volume change, but a significant advantage is retained. In any event, the improved interfacial strength is of greater practical importance in the early hours of bolt installation, before the relative shifting of strata has occured.

EXAMPLE 3

The 70/30 (Example 1) and 60/40 (Example 2b) compositions of the invention, which are preferred for uses in which maximum strength is required, and the above-described control composition, were tested for pull strength in a limestone block. In this test the composition to be tested, cartridged as described in Example 1, was placed in a 30.5-cm.-long, 2.5-cm.-diameter clean, dry hole in a limestone block. The cartridge, which was 30.5-cm.-long and 2.3 cm. in diameter, was broken, and the components were mixed, by the penetration and rotation therein of a 38-cm.-long, 1.9-cm.-diameter headed steel reinforcing rod. The rotation speed was about 300 rpm., and mixing time 15 seconds. Except where noted, a pull force was applied to the rod in ten minutes (after mixing was initiated), a time selected to minimize the effect of possible variations in gel time. The results are given in the following table in terms of the axial displacement of the rod at an 89 kN load, and of the load at which the rod pulled out completely (maximum pull strength).

| Test No. | Composition | Resin/Water | Resin** Lot No. | Displacement at 89 kN (cm.) | Max. Pull Strength (kN) |
| --- | --- | --- | --- | --- | --- |
| 1 | Ex. 1 | 3.3 | K29 | 0.340 | 125 |
| 2 | Ex. 1 | 3.3 | K29 | 0.406 | 125 |
| 3 | Ex. 1 | 3.3 | K19 | 0.297 | 116 |
| 4 | Ex. 1 | 3.3 | USS9E1074 | 0.267 | 125 |
| 5 | Ex. 1 | 3.3 | USS9E1074 | 0.267 | 133 |
| 6 | Ex. 1 | 3.3 | USS9E1074 | 0.361 | 116 |
| 7 | Ex. 1 | 3.3 | USS9E1074 | 0.361 | 133 |
| Average 1–7 |  |  |  | 0.329 | 125 |
| 8 | Ex. 2b | 2.0 | K19 | 0.287* | 98 |
| 9 | Ex. 2b | 2.0 | K19 | 0.503* | 89 |
| 10 | Ex. 2b | 2.0 | K19 | 0.605 | 116 |
| 11 | Ex. 2b | 2.0 | K29 | 0.381 | 107 |
| 12 | Ex. 2b | 2.0 | K29 | 0.351 | 98 |
| 13 | Ex. 2b | 2.0 | K29 | 0.285 | 125 |
| 14 | Ex. 2b | 2.0 | K29 | 0.533 | 98 |
| Average 8–14 |  |  |  | 0.421 | 104 |
| 15 | Control | 50.0 | USS9B1074 | 0.610 | 98 |
| 16 | Control | 50.0 | K13A | 0.711 | 89 |
| 17 | Control | 50.0 | K13A | 0.356 | 98 |
| 18 | Control | 50.0 | USS9E1074 | 0.635 | 89 |
| 19 | Control | 50.0 | K34 | 0.493 | 107 |
| 20 | Control | 50.0 | K34 | 0.686 | 107 |
| 21 | Control | 50.0 | K34 | 0.394 | 116 |
| Average 15–21 |  |  |  | 0.555 | 101 |

*Pull-tested in 5 minutes
**K nos. were Koppers resins; USS nos. were United States Steel resins.

The above results show that under the conditions of these tests the addition of water to the resin grouting system, even as an inert diluent, need not cause a weakening of the grout, as might be expected, but, on the contrary, can have a beneficial effect.

Although the shear strength of a resin grout appears to decrease as the amount of resin formulation therein decreases, the water-containing grouts of the invention have shear strengths which are at least equal to the interfacial shear strength between the grout and many rock materials. Also, lower shear strength can be compensated for by longer anchoring lengths.

Compositions 2(d), 2(e), and 2(f) had five-minute pull strengths in limestone of 45, 27, and 18 kN, respectively. These compositions, whose strengths are comparable to those achieved with the Split-Set friction bolt and the United States Bureau of Mines cement-water grout, as described by R. Hoppe in the Engineering and Mining Journal, February, 1979, can be used to grout bolts in weak rock, and where minimum cost is desired.

The presence of foreign matter such as drill cuttings in a hole has been found to adversely affect the early interfacial strength of the grouting composition of the invention as evidenced by the above-described 5- and 10-minute pull tests in limestone. Although in such holes the strength appears to improve with time, it is preferred that the drill holes be clean, e.g., by the use of air to blow out particulate matter therein.

EXAMPLE 4

Cartridges of the 70/30 composition and the control composition described in Example 1 were stored in boxes for 12 weeks at 38° C. At the end of this time, the 70/30 cartridge were dry and clean, in contrast to the control cartridges, which were oily. Pull strength measurements were made on 43-cm. cartridges with a 74-cm. bolt in a 61-cm. steel pipe. The five-minute maximum pull strength was 150 kN for the 70/30 composition, and 72 kN for the control composition.

EXAMPLE 5

Experiments were carried out to study the nature of any volume change that may occur when components A and B of the present composition are combined and mixed, whereby the polyester and crosslinking agent therein react. Specimens having a total weight of 20-24 grams were prepared by weighing the required amount of component B on top of component A on a sheet of Teflon. For example, for the 70/30 composition described in Example 1, the amounts of components A and B used were 14 grams and 6 grams, respectively. The components were mixed rapidly and then transferred to a Teflon mold of semicircular cross-section, 7.620 cm. long and 0.635 cm. in radius. The mold was clamped for 10 minutes in a manner such that the specimen was able to expand only in one longitudinal direction. The length of the hardened specimen was measured to ±0.0025 cm. and the linear change recorded as "percent linear change" with 7.620 cm=100%.

|  |  | % Linear Change | | | | | |
|---|---|---|---|---|---|---|---|
|  |  | 1 Min. Resin | | 2 Min. Resin | | 5 Min. Resin | |
| Composition | Resin/Water | 10 Min. | 6-12 Days | 10 Min. | 6-12 Days | 10 Min. | 6-12 Days |
| Ex. 2a | 6.0 | −0.13 | −0.46 | +0.06 | −0.33 | +0.10 | −0.13 |
| Ex. 1 | 3.3 | +0.16 | −0.23 | +0.23 | −0.24 | +0.23 | +0.10 |
| Ex. 2b | 2.0 | +0.20 | −0.26 | +0.16 | −0.40 | +0.16 | −0.03 |
| Ex. 2c | 1.2 | +0.30 | −0.26 | +0.23 | −0.30 | +0.20 | −0.20 |
| Ex. 2d | 0.9 | +0.20 | −0.26 | +0.30 | −0.13 | +0.24 | −0.03 |
| Ex. 2e | 0.5 | +0.23 | −0.13 | +0.13 | −0.23 | +0.23 | −0.06 |

As is shown in the preceding table, the composition of the invention expands when the components thereof are mixed together, expansion in the described test having been observed on all freshly prepared specimens except one which gelled the fastest and contained the minimum amount of water. While the expansion was not permanent, and was followed by contraction at some later time depending on the temperature and the composition, a volume advantage over the control composition was observed even after ten days. As was stated previously, this initial expansion is believed to account for the improved interfacial strength obtained in smooth-walled holes with compositions of the invention. The volume change with time is shown in the following table:

| | Linear Change (Room Temperature) % | |
|---|---|---|
| Time After Mixing | Composition of Ex. 1* | Control* |
| 10 min. | +0.16 | −0.10 |
| 1 hr. | +0.16 | −0.16 |
| 2 hrs. | +0.16 | −0.20 |
| 4 hrs. | +0.13 | −0.23 |
| 8 hrs. | +0.09 | −0.27 |
| 24 hrs. | 0 | −0.33 |
| 120 hrs. | −0.15 | −0.38 |
| 240 hrs. | −0.29 | −0.42 |

*"One-Minute Resin"

Larger particle size fillers, e.g., sand having a median particle size of 150μ, as a replacement for the limestone in component A reduce the contraction. For example, the composition of Example 1 described in the preceding table showed only a −0.04% change in 120 hours when it contained 51.1% sand in component A and 21.8% limestone in component B. The presence of dissolved salts in the water also extends the duration of the expanded condition. For example, when the water in component B of the composition described in the preceding table contained dissolved calcium chloride (20 grams per 100 milliliters of water), the linear change was +0.2, +0.2, +0.2, and +0.17% after 10 minutes, 1 hour, 3 hours, and 48 hours, respectively.

What is claimed is:
1. In an organic grouting composition comprising
   (a) a first component containing a resin formulation comprising an unsaturated polymerizable polyester resin mixed with a monomeric polymerizable ethylenic crosslinking agent therefor, a polymerization inhibitor, and a promoter for a peroxide catalyst,
   (b) separated from said first component, a second component containing a peroxide catalyst, and
   (c) a particulate solid filler, said polyester and said cross-linking agent, when said first and second components are in a combined and mixed condition around a reinforcing member in a hole, being adapted to react rapidly to form a hardened anchoring composition around the reinforcing member, the improvement comprising the addition of water and a diffusing agent to said first and/or second components, and a particulate solid filler to both said first and second components, the weight ratio of said resin formulation to water being in the range of from 0.3 to 6, said resin formulation constituting about from 5 to 22 percent, said water from 4 to 19 percent, and said solid filler about from 65 to 75 percent of said composition by weight, the weight ratio of said solid filler to said resin formulation being in the range of about from

3 to 15, and any portion of said solid filler which is hydratable being present only in a substantially water-free component.

2. A grouting composition of claim 1 wherein water is added to said second component.

3. A grouting composition of claim 2 wherein the water in said second component is substantially all of the water in said composition.

4. A grouting composition of claim 1 wherein said diffusing agent is a thickening agent in said water.

5. A grouting composition of claim 4 wherein said thickening agent is an organic polymer.

6. A grouting composition of claim 2 wherein said diffusing agent is a surface-active agent.

7. A grouting composition of claim 1 wherein substantially all of said solid filler in said composition is non-hydratable.

8. A grouting composition of claim 3 wherein hydratable solid filler is present in said first component.

9. A grouting composition of claim 8 wherein non-hydratable solid filler is present in said first component.

10. A grouting composition of claim 1, 2 or 4 wherein the weight ratio of said resin formulation to water is in the range of from 1 to 5, and of said solid filler to resin formulation in the range of about from 3.5 to 5.5.

11. A grouting composition of claim 10 wherein said solid filler is limestone.

12. A grouting composition of claim 10 wherein at least part of said solid filler is sand.

13. In an organic grouting composition comprising
    (a) a first component containing a resin formulation comprising an unsaturated polymerizable polyester resin mixed with a monomeric polymerizable ethylenic cross-linking agent therefor, a polymerization inhibitor, and a promoter for a peroxide catalyst,
    (b) separated from said first component, a second component containing a peroxide catalyst, and
    (c) a particulate solid filler, said polyester and said cross-linking agent, when said first and second components are in a combined and mixed condition around a reinforcing member in a hole, being adapted to react rapidly to form a hardened anchoring composition around the reinforcing member, the improvement comprising added water and a water-thickening and/or surface-active agent in at least said second component, and a particulate solid filler in both said first and second components, the weight ratio of said resin formulation to water being in the range of from 1.0 to 5.0, the weight ratio of said solid filler to said resin formulation being in the range of about from 3.5 to 5.5, and said composition being adapted to undergo a positive volume change during the reaction of said polymer and said cross-linking agent to form a hardened grout.

14. A grouting composition of claim 13 wherein the water in said second component in substantially all of the water in said composition.

15. A grouting composition of claim 13 wherein substantially all of said solid filler in said composition is non-hydratable.

* * * * *

UNITED STATES PATENT OFFICE
CERTIFICATE OF CORRECTION

PATENT NO. : 4,280,943

DATED : July 28, 1981

INVENTOR(S) : Joseph R. Bivens; William M. Lyerly; Walter J. Simmons.

It is certified that error appears in the above-identified patent and that said Letters Patent are hereby corrected as shown below:

Column 2, line 2, "receiver" should read -- reactive --.
Claim 14, line 2, "in" (second occurrence) should read -- is --.

Signed and Sealed this

Sixth Day of October 1981

[SEAL]

Attest:

GERALD J. MOSSINGHOFF

Attesting Officer    Commissioner of Patents and Trademarks